United States Patent [19]
Ebner et al.

[11] Patent Number: 6,124,570
[45] Date of Patent: Sep. 26, 2000

[54] HEATING AND AIR CONDITIONING SYSTEM FOR VEHICLES

[75] Inventors: Andreas Ebner, Stuttgart; Wolfgang Henseler, Tuebingen, both of Germany

[73] Assignee: Micro Compact Car AG, Biel, Switzerland

[21] Appl. No.: 09/253,548

[22] Filed: Feb. 22, 1999

[30] Foreign Application Priority Data

Feb. 20, 1998 [DE] Germany .......................... 198 07 143
Jan. 20, 1999 [DE] Germany .......................... 199 02 050

[51] Int. Cl.⁷ ................ B60L 1/02; F24D 13/00
[52] U.S. Cl. ........................ 219/202; 392/347; 392/485
[58] Field of Search ................................ 219/202, 208, 219/530, 540, 505, 504; 392/350, 490, 485

[56] References Cited

U.S. PATENT DOCUMENTS

| | | | |
|---|---|---|---|
| 5,057,672 | 10/1991 | Bohlender et al. | 219/540 |
| 5,239,163 | 8/1993 | Brouwers | 219/202 |
| 5,256,857 | 10/1993 | Curhan et al. | 219/202 |
| 5,665,261 | 9/1997 | Damsohn et al. | 219/504 |
| 5,995,711 | 11/1999 | Fukuoka et al. | 392/347 |

FOREIGN PATENT DOCUMENTS

| | | |
|---|---|---|
| 3715194 A1 | 11/1988 | Germany. |
| 4238364 A1 | 5/1994 | Germany. |
| 4433814 A1 | 3/1996 | Germany. |
| 10-217754 | 8/1998 | Japan. |

*Primary Examiner*—Teresa Walberg
*Assistant Examiner*—Vinod D. Patel
*Attorney, Agent, or Firm*—Evenson, McKeown, Edwards & Lenahan, P.L.L.C.

[57] ABSTRACT

A heating or air conditioning system for a passenger compartment of a motor vehicle has a heat exchanger which is arranged in a cooling water circuit of an internal combustion engine and through which an air stream passes. A supplementary electric heater through which the same air stream can flow is also provided. In order to design the heating or air conditioning system in such a way that a separate installation space is not necessary for the installation of the supplementary electric heater, the supplementary electric heater is physically integrated into the heat exchanger. The supplementary electric heater includes a plurality of electric heating rod assemblies arranged between water ducts of the heat exchanger which extend parallel with one another along the air passage surface of the heat exchanger.

35 Claims, 6 Drawing Sheets

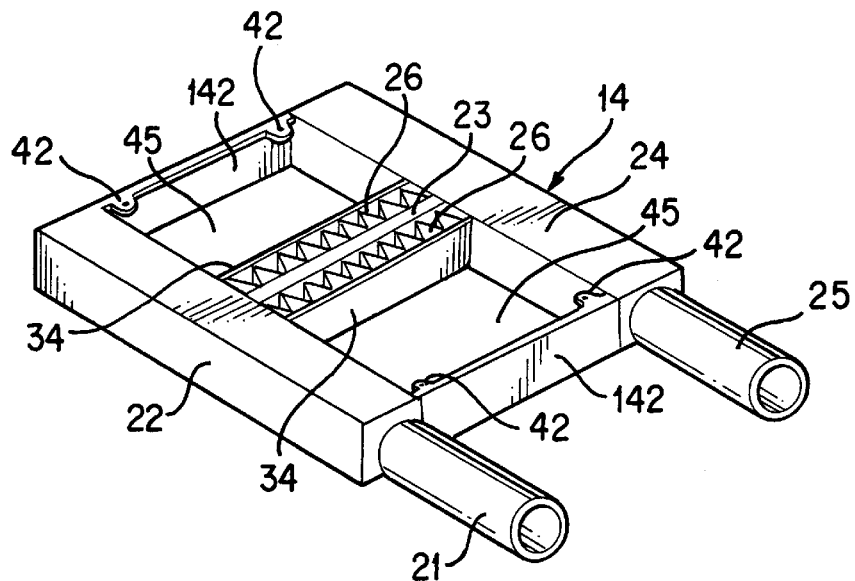
FIG. 4
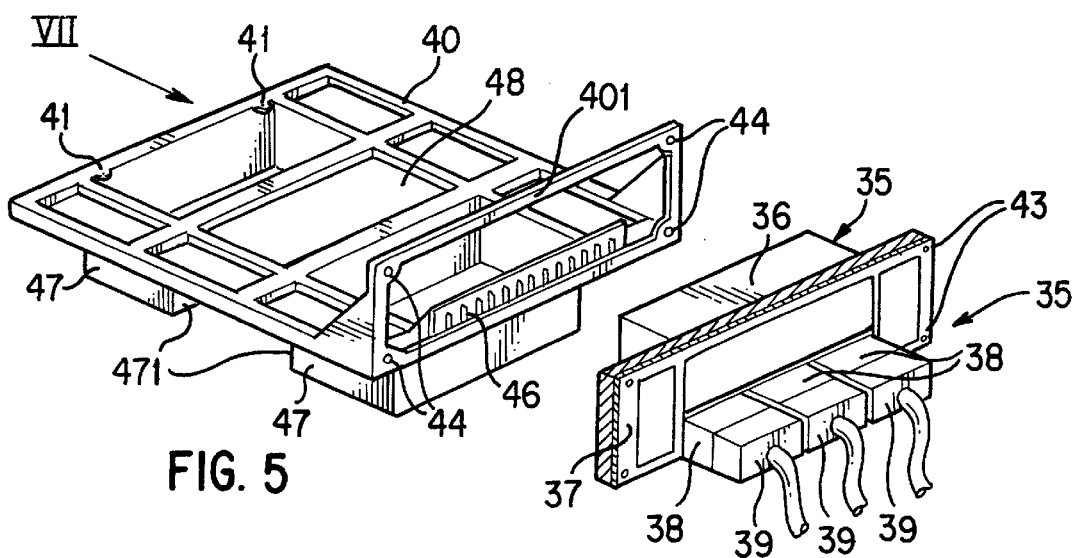
FIG. 5
FIG. 6

HEATING AND AIR CONDITIONING SYSTEM FOR VEHICLES

BACKGROUND AND SUMMARY OF THE INVENTION

This application claims the priority of German applications 198 07 143.4-16 filed Feb. 20, 1998 in Germany, and 199 02 050.7 filed in Germany Jan. 20, 1999, the disclosures of which are expressly incorporated by reference herein.

The invention relates to a heating or air conditioning system for a passenger compartment of a motor vehicle of the type having a heat exchanger arranged in a cooling water/fluid circuit of an internal combustion engine through which an air stream passes and having a supplementary electric heater.

In motor vehicles whose internal combustion engine or other engine is designed with optimized consumption, there is significantly less dissipated heat, as a result of which the heating energy made available by the engine cooling system becomes too low to heat the passenger cell or compartment. This is remedied by a supplementary electric heater which, when necessary, heats further the air stream flowing through the heat exchanger.

In a known heating system Of the type mentioned above described in German Patent Document DE 37 15 194 A1, the heat exchanger through which cooling water flows is arranged in a duct which conducts external air to the passenger compartment. In addition, a supplementary electric heater, which ensures that the air is heated up during the warm up and warm running phase of the internal combustion engine, is also provided in the duct which conducts the external air. In order to heat up the air with the supplementary heater as intensively as possible, the heater has a heating conductor which has a large surface, can be regulated to a low temperature of less than 150° C., and is shaped as a flat, box-shaped structure which is arranged directly downstream of the heat exchanger in the direction of flow of the air and is attached to the heat exchanger, the heat exchanger forming the carrier for the supplementary electric heater.

In a known heating system of the type mentioned above and described in German Patent Document DE 42 38 364 A1, the supplementary electric heater is also assigned downstream of the heat exchanger, so that the air stream produced by a blower firstly flows through the heat exchanger, is heated only partially and then flows through the supplementary electric heater and is heated here to a relatively high temperature. The air which is preheated in this way flows into the passenger compartment. An interior temperature sensor which is arranged in the passenger compartment and which determines the heating requirement, together with a set point value transmitter, and in which air flowing into the passenger compartment is arranged, controls the flow of cooling water through the heat exchanger and the period for which the supplementary heater is switched on by means of a control unit.

In a heating system, which is also known for motor vehicles from German Patent Document DE 44 33 814 A1, the supplementary electric heater which is also present there is composed of a plurality of so-called PTC (Positive Temperature Coefficient) elements which are electrically heated and through which, or around which, the air stream leaving the heat exchanger flows.

In all known heating systems, the supplementary electric heater in the air duct which conducts the air stream is arranged downstream of the heat exchanger, which makes it necessary to allow for the supplementary electric heater in the configuration of the air duct, since additional installation space has to he provided for the supplementary electric heater.

An object of the invention is to design a heating or air conditioning system of the type mentioned in such a way that a separate installation space is not required in the air-conducting channel for the installation of the supplementary electric heater.

This object is achieved by providing an arrangement where the supplementary electric heater is integrated physically into the heat exchanger.

The heating or air conditioning system according to the invention has the advantage that as a result of the direct integration of the supplementary electric heater into the heat exchanger, the dimensions of the heat exchanger remain unchanged so that it is possible, without structural changes, to introduce into the air channel either a normal heat exchanger through which only the cooling water circuit flows, or a heat exchanger with an integrated supplementary electric heater. As a result, there is the additional possibility of providing heating or air conditioning systems which have already been installed with a supplementary electric heater at a later date, which can be done by simply exchanging the heat exchanger in the air conditioning box. As a result of the integration of the supplementary electric heater into the heater's heat exchanger, the air volume flow is also reduced to a lesser degree than in the known heating systems. For this reason, it is not necessary to adapt the blower when the supplementary electric heater is installed.

Expedient embodiments of the heating or air conditioning system according to the invention, with advantageous developments and improvements of the invention, are described below and in the claims.

According to certain preferred embodiments of the invention, the heat exchanger has a plurality of water ducts through which the cooling water flows and which extend in parallel at a distance from one another along the air passage surface of the heat exchanger and open at their respective ends into a water collecting box, and heat-conducting lamellas which are connected to the water ducts. The supplementary electric heater has a plurality of electric heating rod assemblies which extend between the water ducts and, preferably distributed uniformly and parallel thereto, along the air passage surface. In this arrangement, preferably a water duct provided with heat-conducting elements and an electric heating rod assembly run parallel one next to the other in an alternating fashion.

According to certain preferred embodiments of the invention, each heating rod assembly has two busbars running parallel with one another, and a plurality of PTC elements which are arranged spaced apart from one another between the two busbars and are connected mechanically and electrically conductively thereto.

In order to avoid electrical short-circuits, an electric insulating plate is arranged between each heating rod assembly and an adjacent water duct, on which insulating plate both the heat-conducting elements connected to the water duct and the heat-conducting elements projecting from the busbars are supported.

According to certain preferred embodiments of the invention, in order to control the supplementary heater as a function of the variables, such as external temperature and cooling water temperature, which determine the heat requirement, a control unit is provided which is arranged on the heat exchanger in such a way, that the air flowing into the heat exchanger passes over it. The control unit has an electronic power system and cooling elements for dissipating heat and the control unit is arranged on the air inlet side of the heat exchanger in such a way that at least the cooling elements are located in the air stream. By virtue of the fact that the control unit which is necessary for controlling the supplementary electric heater is mounted on the heat exchanger, a compact physical unit is obtained which can be mounted in the air conditioning box in a single mounting procedure by screwing, clipping or by means of some other connection which is free of rattling and without play, without cabling the heating rod assemblies and the control unit to one another.

In accordance with certain advantageous embodiments of the invention, the control unit is arranged on a plastic frame which is fitted onto the heat exchanger on the air inlet side of said heat exchanger and is connected, for example clipped or screwed, thereto. The electric heating rod assemblies of the supplementary heater are arranged between the water ducts of the heat exchanger, and are accommodated in a frame-like tub which projects integrally from the underside of the plastic frame to dip into the heat exchanger. Longer tub walls of the frame-like tubs preferably form the insulating plates running between the heating rod assemblies and the water ducts.

According to advantageous embodiments of the invention, a mechanical on/off switch is provided for the supplementary electric heater, which switch is spatially integrated in the supplementary heater and can be actuated by a manual control knob located on the dashboard, via, for example, a Bowden cable and a cam which can be pivoted by said cable. The spatial integration of the on/off switch in the supplementary electric heater provides a compact design of the complete supplementary heating system with mechanical switching device. In this way it is possible to restrict the heating variants with or without the supplementary electric heater just to the air conditioning box without having to change further control elements on the dashboard. The variants of the blower box with or without a supplementary electric heater are not formed until directly before mounting, which means that air conditioning boxes and supplementary electric heating modules can be supplied separately. As a result of the variants which are formed directly before installation, there is a saving in logistics costs and the co-ordination expenditure is minimized. Production can react more flexibly to demand. At the same time, the supplementary electric heater can be both integrated into the heat exchanger and introduced into the air stream separately from the heat exchanger.

A saving in terms of physical elements is obtained if, in accordance with one advantageous embodiment of the invention, the on/off switch is actuated by an air mixing flap present in the air conditioning box, for mixing a cold air stream which flows around the heat exchanger and a warm air stream which flows through the heat exchanger, the on/off switch being aligned in such a way that its switching contact which lies in the electric circuit of the supplementary heater is closed in the pivot end position of the air mixing flap for maximum warm air supply. The air mixing flap is activated here by a temperature setting means which defines the pivot position of the air mixing flap.

According to certain advantageous embodiments of the invention, the mechanical on/off switch for the supplementary electric heater can also be spatially arranged on a blower which is disposed upstream of the heat exchanger in order to produce the air stream flowing through the heat exchanger and the supplementary electric heater, in which case the on/off switch can again be activated by a manual control knob located on the dashboard. Here, the same advantages are obtained as when the on/off switch is spatially mounted in the heating module of the supplementary electric heater.

Other objects, advantages and novel features of the present invention will become apparent from the following detailed description of the invention when considered in conjunction with the accompanying drawings.

BRIEF DESCRIPTION OF THE DRAWINGS

FIG. 4 is a perspective view of the heat exchanger in FIGS. 2 and 3, shown before the supplementary electric heater is mounted;

FIG. 5 is a perspective view of a plastic frame which can be fitted onto the heat exchanger according to FIG. 4 and has tubs for holding the supplementary electric heater;

FIG. 6 is a perspective view of a control unit for the supplementary electric heater, which can be connected to the plastic frame in FIG. 5;

DETAILED DESCRIPTION OF THE DRAWINGS

Figure 1:
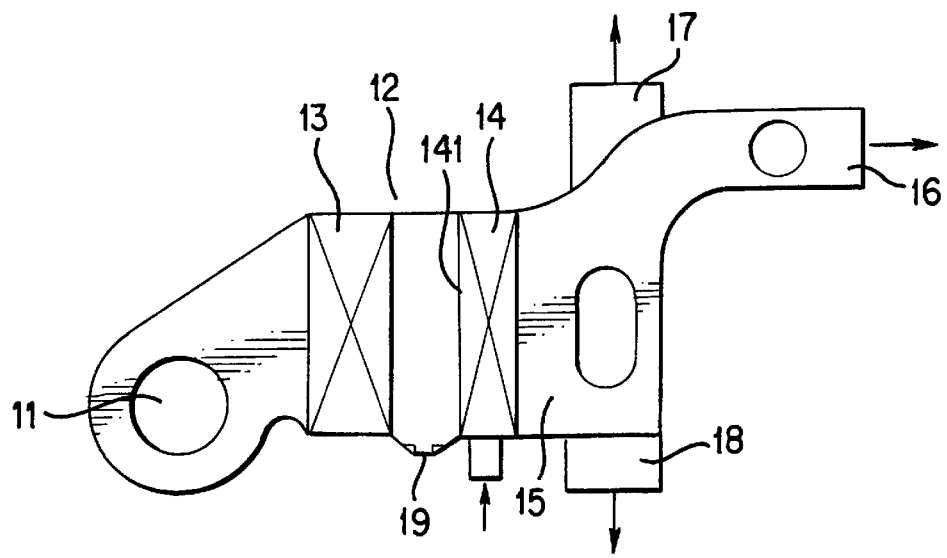
FIG. 1 is a schematic longitudinal sectional view of an air conditioning system for a passenger compartment of a motor vehicle, constructed according to preferred embodiments of the present invention.

The air conditioning system which is illustrated schematically in longitudinal section in FIG. 1 has a blower 11 which is connected to an inlet of an air-conducting box 12, also referred to as an air conditioning box. The air-conducting box 12 has a vaporizer 13, which is connected into a coolant circuit, and a heat exchanger 14, which is connected into the coolant circuit of the internal combustion engine of the motor vehicle, said vaporizer 13 and heat exchanger 14 being arranged downstream of the blower stream in the aforesaid sequence. Arranged directly downstream of the heat exchanger 14 is an air distributor 15 from which three air ducts 16–18 branch off. The central air duct 16 leads to air outlet vents (not illustrated here) in the central plane of the passenger compartment. The air duct 17 leads to defroster vents on the underside of the windshield of the passenger compartment. The air duct 18 leads to footwell vents arranged in the footwell of the passenger compartment. Either the fresh air which is sucked in from the vehicle's surroundings by the blower 11 or the mixed air which is sucked in from the passenger compartment by the blower 11 is cooled in the vaporizer 13 and dehumidified and heated in the heat exchanger 14 through which the hot cooling water of the internal combustion engine flows. The air which is conditioned in this way is distributed between the individual air outlet vents in the passenger compartment by means of the air distributor 15. The water which is precipitated in the air-conducting box 12 from the air fed by the blower 11 is carried away by means of a water separator 19 in the section of the box between the vaporizer 13 and heat exchanger 14.

Figure 2:
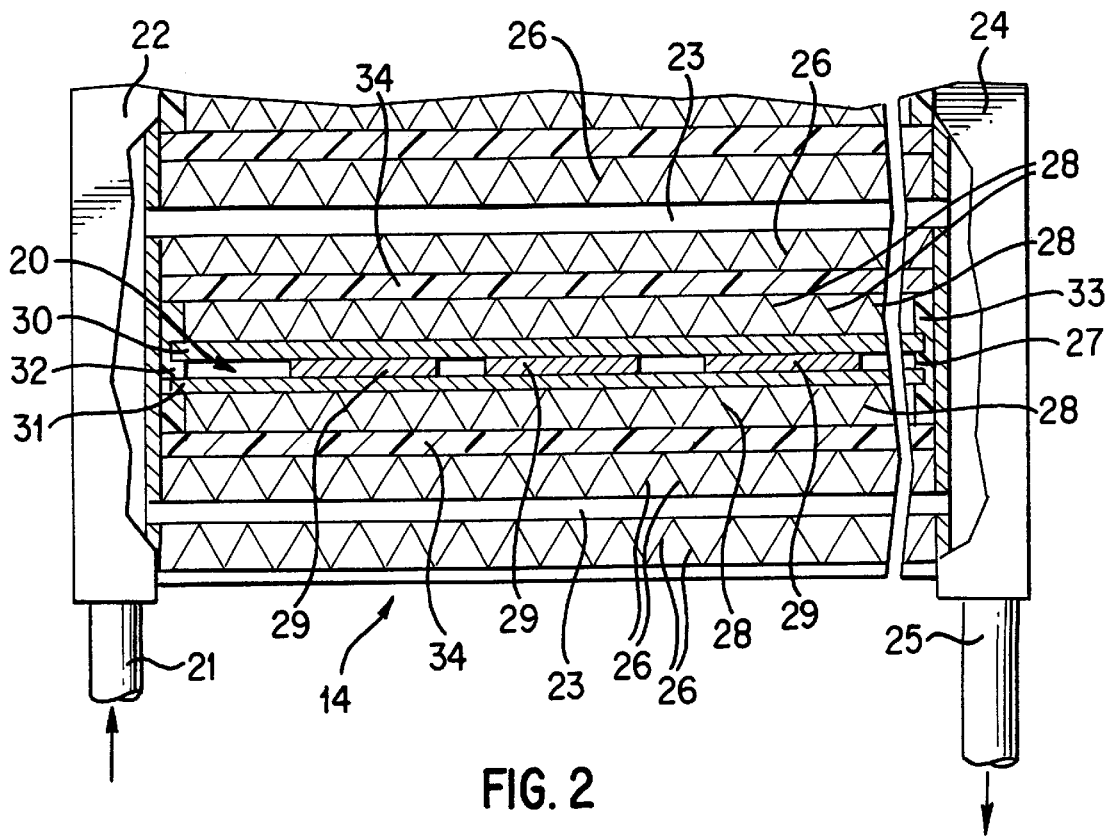
FIG. 2 is a longitudinal sectional view along the sectional line II—II in FIG. 3 of a heat exchanger with an integrated supplementary electric heater of the air conditioning system in FIG. 1.
Figure 3:
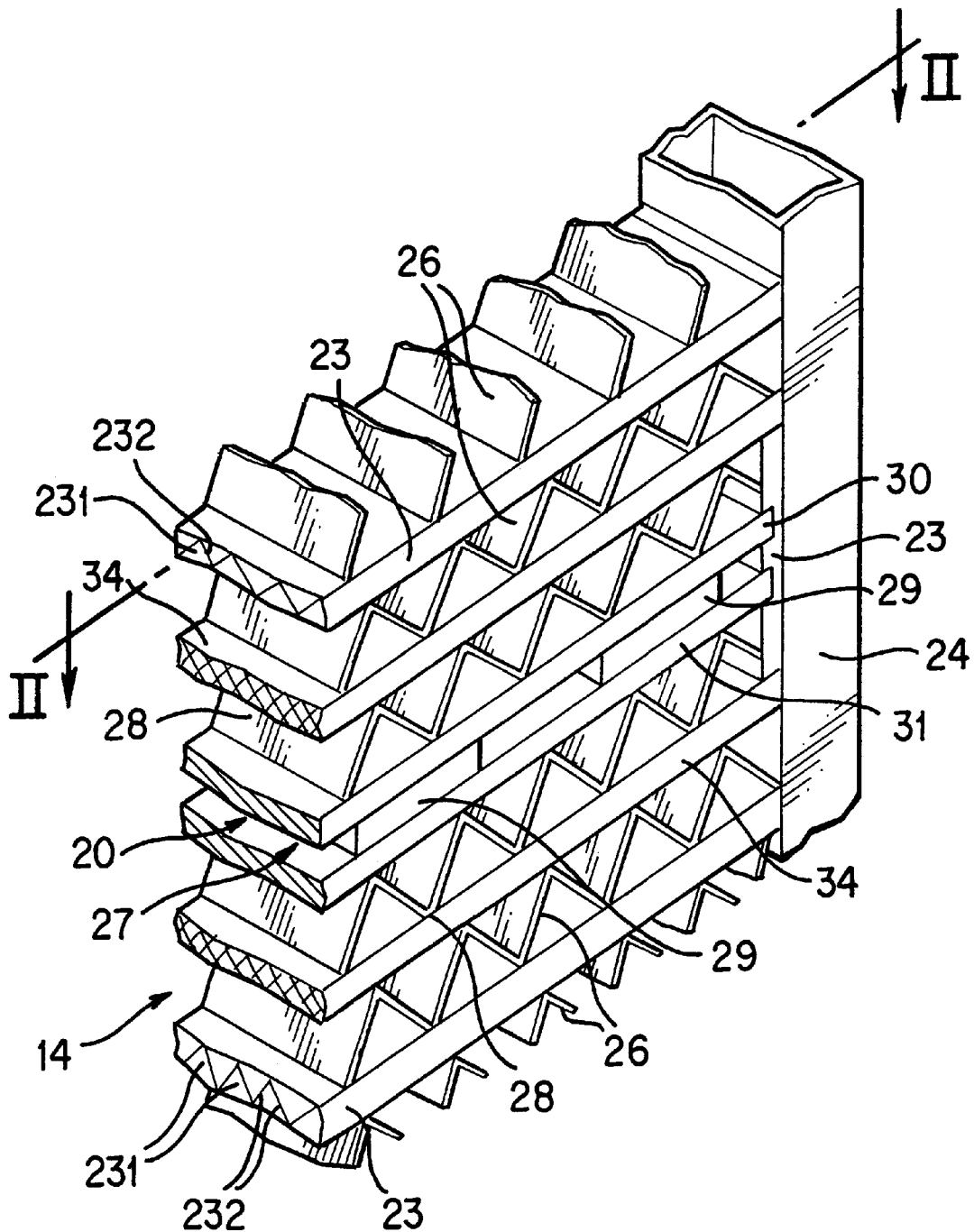
FIG. 3 is a perspective part sectional view which shows portions of the heat exchanger with the integrated supplementary electric heater in FIG. 2.

FIGS. 2 and 3 illustrate the heat exchanger 14 with all its details. The hot cooling water coming from the internal combustion engine passes via a cooling water inflow 21 into a water collecting box 22 and is distributed here between a plurality of water ducts 23 which extend in parallel with one another over the entire air passage surface 141 of the heat exchanger 14. The water ducts 23 open into a second water collecting box 24 which is arranged on the opposite side of the heat exchanger 14 parallel with the first water collecting box 22. The water which flows into the second water collecting box 24 is fed back to the internal combustion engine by means of a cooling water outlet 25. As is clear from the perspective view in FIG. 3, the individual water ducts 23 which are parallel with one another are divided into a plurality of duct pipes 231 which lie one next to the other, have a rectangular cross section and are separated from one another by one duct wall 232 in each case. In the exemplary embodiment in FIG. 3, each water duct 23 is designed with four duct pipes 231. Heat-conducting elements 26 in the form of lamellas or ribs are arranged on the upper side and underside of each water duct 23, said elements having a mechanically fixed and heat-conducting connection to the walls of the water duct 23 and ensuring that there is a satisfactory dissipation of heat to the air flowing through them.

In order to cover the heater's heating requirements when the internal combustion engine has not yet warmed up, and/or in order to cover the heater's maximum requirements in motor vehicles with internal combustion engines with optimized consumption, in which the heater's heating requirements can no longer be covered solely by the cooling water circuit of the internal combustion engine, a supplementary electric heater 20 is provided, through which air fed by the blower 11 also flows, said air also flowing through the heat exchanger 14 and additionally heating it up. As is clear from FIGS. 2 and 3, the supplementary electric heater 20 is physically integrated into the heat exchanger 14, specifically in such a way that the latter does not change its dimensions in comparison with a conventional heat exchanger 14 through which only cooling water flows and which does not have a supplementary electric heater.

The supplementary electric heater 20 has a plurality of electric heating rod assemblies 27 which extend between the water ducts 23 and, preferably distributed uniformly and parallel thereto, along the air passage surface 141 of the heat exchanger 14. At the same time, the water duct 23, which is equipped with the heat-conducting elements 26, and an electric heating rod assembly 27 run parallel one next to the other in an alternating fashion. In order to optimize the dissipation of heat to the air stream, each heating rod assembly 27 is also provided on its two outer sides, facing away from one another, with heat-conducting elements 28 in the form of lamellas or ribs. Each heating rod assembly 27 has two busbars 30, 31, running parallel with one another, and a plurality of so-called PTC elements 29, which are arranged spaced apart between the two busbars 30, 31 and are connected mechanically and electrically conductively thereto.

These PTC elements 29 have, for example, a honeycomb or hollow-box profile and are manufactured from an electrically conductive material with a positive temperature coefficient. By means of the two busbars 30, 31, the PTC elements 29 are connected to an electric circuit. The two busbars 30, 31 are secured at the ends in insulators 32, 33 which are attached to the inner surfaces, facing one another, of the water collecting boxes 22 and 24. In order to avoid electrical short-circuits, an insulating plate 34 is arranged between each water duct 23 with heat-conducting elements 26 and each heating rod assembly 27 with heat-conducting elements 28, the insulating plate 34 extending parallel with the water duct 23 and heating rod assembly 27 between the two water collecting boxes 22, 24. The heat-conducting elements 26 and 28 which are secured by the water duct 23 or busbars 30, 31 are supported on said insulating plate 34 on sides facing away from one another. As is clear from FIG. 3, the water duct 23 with heat-conducting elements 26, the busbars 30, 31 with the PTC elements 29, the insulating plates 34 and the insulators 32, 33 extend over the entire depth of the heat exchanger 14 viewed in the direction of flow of the air.

A control unit 35 (FIG. 6), which is combined with the heat exchanger 14 to form one physical unit, is provided for controlling the supplementary electric heater 20 as a function of variables, such as external temperature, cooling water temperature and the like which determine the heat requirements. The control unit 35 has an electronic power system and cooling elements for dissipating the heat generated in the electronic power system, which are symbolized in their entirety in FIG. 6 by the box 36. The electronic power system and cooling elements 36 are arranged on one printed circuit board 37 which is equipped with sockets 38 for electric connecting plugs 39. In addition, the printed circuit board 37 also has a multipoint connector (not shown here) by means of which the electronic power system can be connected to the heating rod assemblies 27 of the supplementary electric heater 20. The multipoint connector is arranged on the component-mounting side of the printed circuit board 37, said side facing away from the connecting plugs 39 and also being fitted with the electronic power system with cooling element 36.

The control unit 35 is then arranged on the air inlet side of the heat exchanger 14 in such a way that the electronic power system with cooling element 36 lies in the air stream entering the heat exchanger 14. For this purpose, a plastic frame 40 is provided which lies flush on the upper side, forming the air inlet surface, of the heat exchanger 14 (illustrated in a perspective view in FIG. 4) and is screwed, specifically into cross members 142 which rigidly connect the two water collecting boxes 22, 24 to one another. For this purpose, threaded screws are plugged through through-holes 41 in the plastic frame 40 and screwed into threaded holes 42 in the cross member 142. The plastic frame 40 is fitted on its front side facing the water inflow and outflow 21, 25 with a rectangular frame component 401 which projects from the frame 40 in an integral fashion and on which the printed circuit board 37 is fitted in a flush arrangement and is attached by means of screws which are plugged through through-holes 43 in the printed circuit board 37 and screwed into threaded holes 44 in the frame component 401. Instead of screwing, clipping may also be provided, which is suitable for attaching the plastic frame 40 to the heat exchanger 14.

After the printed circuit board 37 has been attached to the frame component 401, the electronic power system with cooling element 36 projects over the air passage surface 141 of the heat exchanger 14 so that air entering the heat exchanger 14 passes over it. The multipoint connector on the printed circuit board 37 is plugged here into a further multipoint connector 46 which is attached to the frame limb of the frame component 401, said limb lying in a plane with the plastic frame 40. The electrical connection to the supplementary electric heater 20 is formed starting from this multipoint connector 46.

Figure 7:
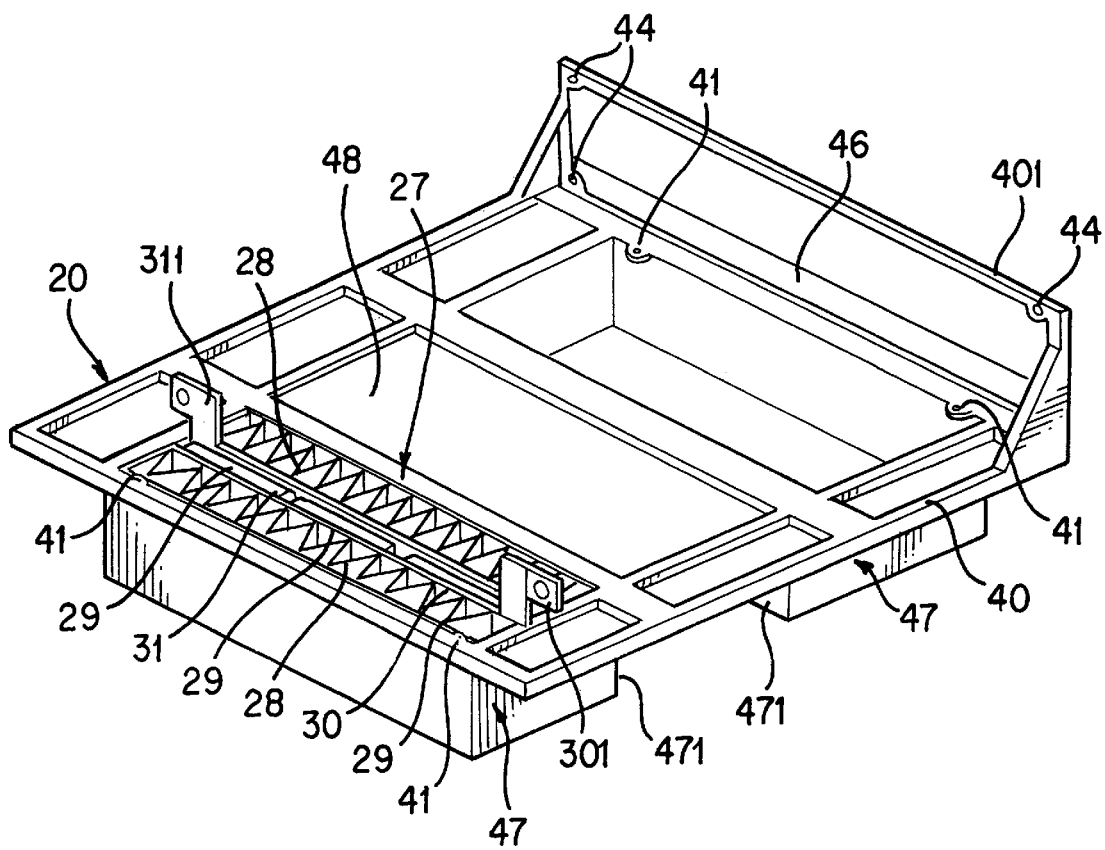
FIG. 7 is a perspective view of the plastic frame taken in the direction of the arrow VII in FIG. 5, showing an inserted heating rod assembly of the supplementary electric heater, illustrated on an enlarged scale.

In the heat exchanger 14 illustrated in FIG. 4 the supplementary electric heater 20 shown in FIGS. 2 and 3 is not yet installed. Instead, it is premounted in the plastic frame 40, as is shown in FIG. 7, and when the plastic frame 40 is fitted onto the upper side of the heat exchanger 14 in FIG. 4, said heater 20 is inserted into the free spaces 45 which are kept available in the heat exchanger 14, so that overall, the completed heat exchanger 14 in FIGS. 2 and 3 is produced. In order to accommodate the supplementary electric heater 20, a frame-like tub 47 is formed on the plastic frame 40 for each heating rod assembly 27 of the supplementary electric heater 20, said tub 47 protruding from the underside, facing the heat exchanger 14, of the plastic frame 40 and dipping into the free space 45 which is being kept available in the heat exchanger 14 when the plastic frame 40 is fitted onto the heat exchanger 14. In the exemplary embodiment in FIGS. 6 and 7, two parallel tubs 47, which are spaced apart from one another and are arranged at a distance from one another which is determined by the water duct 23 with heat-conducting elements 26 of the heat exchanger 14, are provided in the plastic frame 40. Each tub 47 holds a heating rod assembly 27 of the supplementary heater 20. In FIG. 7, by way of example a tub 47 is equipped with a heating rod assembly 27 such as has already been described above in detail. An identical heating rod assembly 27 is also inserted into the other tub 47 which is still shown free in FIG. 7. Between these two tubs 47 there remains a free space 48 in the plastic frame 40, said free space 48 being filled by the water duct 23 with heat-conducting elements 26 of the heat exchanger 14 in FIG. 4 after the plastic frame 40 has been fitted onto the heat exchanger 14. Here, the internal, longer tub walls 471 rest on the insulating plates 34 which run between the water duct 23 and the heating rod assemblies 27 from one water collecting box 22 to the other water collecting box 24, or assume the insulating function of the insulating plates 34 with respect to the heat-conducting elements 27 on the water duct 23, in which case said insulating plates 34 are dispensed with.

Figure 8:
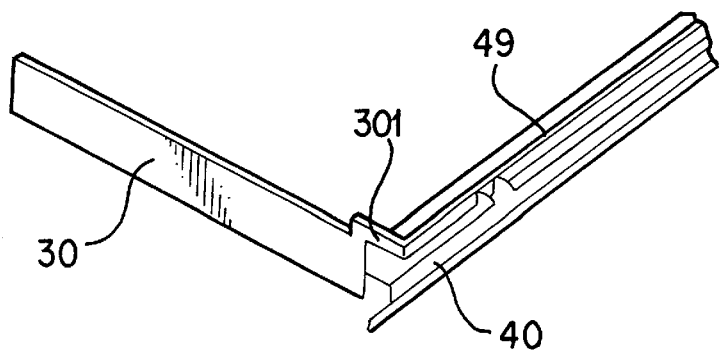
FIG. 8 is a perspective view of a busbar with a contact rail of the supplementary electric heater in FIG. 7, illustrated on an enlarged scale.

As is shown by FIG. 7, the busbars 30, 31 of the two heating rod assemblies 27, between which in each case the PTC elements 29 are clamped, are arranged in such a way that the busbar connections with the same polarity lie in each case on one of the two longitudinal sides of the plastic frame 40. In the exemplary embodiment in FIG. 7, the connecting lugs 301 (positive pole) of the busbars 30 are arranged on the right-hand frame limb, and the connecting lugs 311 (negative pole) of the busbars 31 are arranged on the left-hand frame limb of the plastic frame 40. The electric connecting lines (not illustrated in FIG. 7) of the heating rod assemblies 27 run from these frame limbs of the plastic frame 40 to the multipoint connector 46 on the frame limb of the frame component 401. Preferably, the electric connecting lines are implemented as contact rails 49 which are laid in the frame limbs of the plastic frame 40 and are, for example, clamped in or fused in and can be fitted at the ends with contact tongues which together form the second multipoint connector 46. In this case, the first multipoint connector on the printed circuit board 37 is composed of contact shoes which each engage over one of the contact tongues formed on the contact rails 49. In FIG. 8, the one busbar 30 of a heating rod assembly 27 is illustrated, said busbar 30 being in contact with a contact rail 49 which is laid in the lateral frame limb of the plastic frame 40. Here, the connecting lug 301 of the busbar 30 can be soldered onto the contact rail 49 or designed to be integral therewith.

Figure 9:
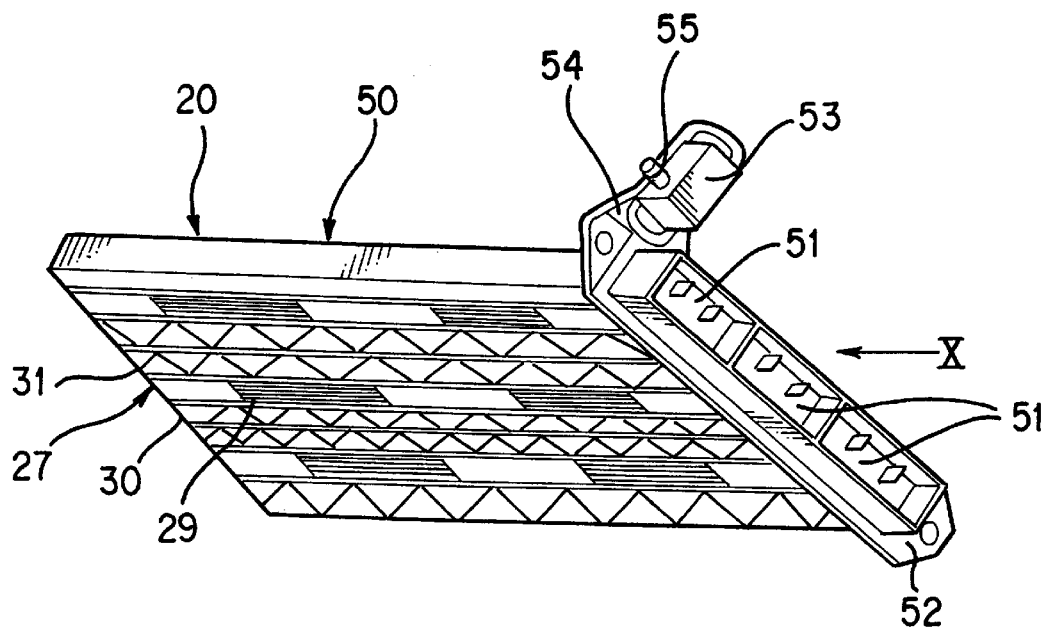
FIG. 9 is a perspective bottom view of a heating module of a supplementary electric heater according to a further exemplary embodiment.

FIG. 9 illustrates a supplementary electric heater 20 which is designed as an independent heating module 50 which, in contrast with FIGS. 1–8, is not integrated into the heat exchanger 14 itself but is instead separated from a conventional heat exchanger and arranged right next to the heat exchanger in the air flow which flows through the heat exchanger 14. A spatial integration of the heating module 50 into the heat exchanger, as in FIGS. 1–8, is, however, readily possible. The heating module 50 is equipped with three heating rod assemblies 27, each heating rod assembly 27 being in turn composed of two busbars 30, 31 with PTC elements 29 arranged between them. The heating rod assemblies 27 are connected at their ends to connecting plugs 51 which are arranged one next to the other in a multipoint plug 52 on the end face of the heating module 50. Spatially integrated into the heating module 50 is a mechanical on/off switch 53 for the supplementary electric heater 20, which switch 53 can be activated by a manual control knob (not illustrated) which is located on the dashboard or at some other place in the cockpit (passenger compartment) of the vehicle. The on/off switch 53 is attached here, preferably in an adjustable fashion, to a bearing clip 54 which is formed integrally on the multipoint plug 52, and projects with an activation plunger 55 into the pivot path of a pivotably mounted cam 56, which is formed on an air mixing flap 57 (FIG. 10) in the exemplary embodiment in FIG. 10. The air mixing flap 57 mixes in a known fashion a cold air stream, passing around the heat exchanger 14 (FIG. 1), with a warm air stream which is heated by the heat exchanger 14, the mixing air temperature being determined by the pivot position of the air mixing flap 57. The air mixing flap 57 is formed, by means of a Bowden cable 58 (FIG. 10), by a temperature setting means (not illustrated here) which is to be controlled manually and is arranged on the dashboard. The activation plunger 55 acts directly on a switching contact (not illustrated here) which is arranged in the circuit of the supplementary electric heater 20, is open in the position of rest and, as a result of being acted on by the cam 56, moves over into its working position which closes the circuit of the supplementary electric heater 20. The on/off switch 53 is mounted here on the bearing clip 54 in such a way that its switching contact is closed in the pivot end position of the air mixing flap 57 for maximum supply of heat. The input/output switch 53 can be clipped, plugged on or screwed to the bearing clip 54 here.

Figure 10:
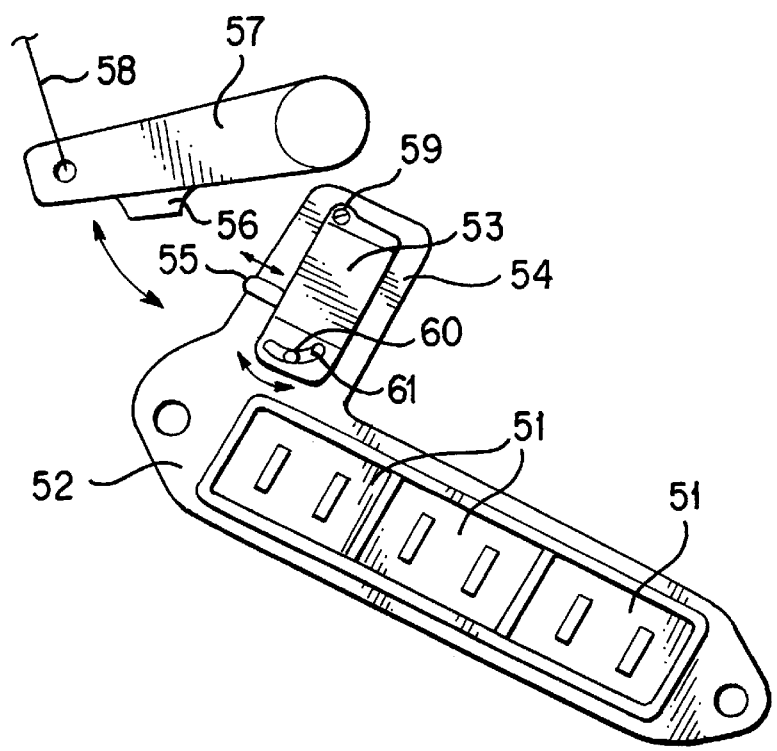
FIG. 10 is a front view of the heating module taken in the direction X in FIG. 9.

In the exemplary embodiment in FIG. 10, the on/off switch 53 is screwed tight to the bearing clip 54, alignment of the on/off switch 53 with respect to the pivot path of the cam 56 on the air mixing flap 57 being possible during mounting. For this purpose, the on/off switch 53 is attached by means of a first screw 59 to the bearing clip 54 in a pivotably movable fashion, and is fitted with an arcuate elongate hole 61 which is arranged concentrically with respect to the screw 59 and through which the screw shaft of a screw 60 which has been screwed into the bearing clip 54 passes. When the screws 59 and 60 are loose, the on/off switch 53 on the bearing clip 54 can be pivoted until it is correctly aligned, that is to say that the cam 56 in the pivot end position of the air mixing flap 57 reliably closes the switching contact of the on/off switch 51 by means of the activation plunger 55. After this setting has been made, the two screws 59, 60 are tightened so that the on/off switch 53 is unchangeably secure in this position.

Figure 11:
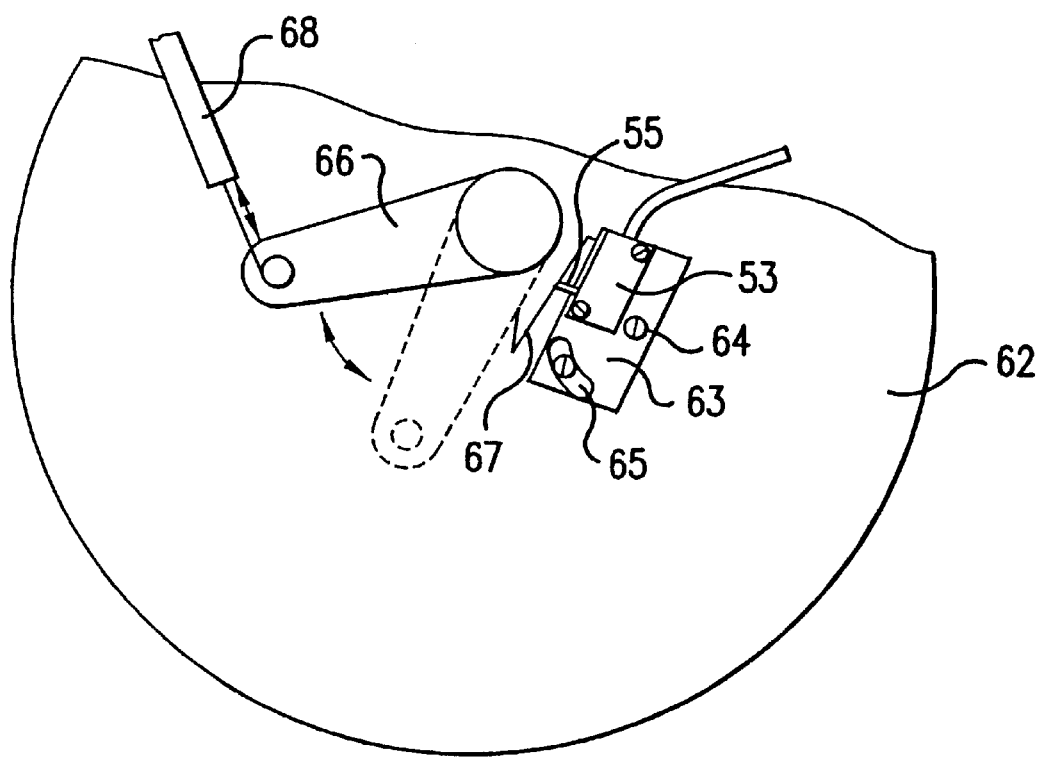
FIG. 11 is a side view of an on/off switch for the supplementary electric heater in FIG. 9 according to a further exemplary embodiment.

In FIG. 11 it is schematically indicated that the on/off switch 53 for the heating module 50 can also be mounted in the air conditioning system separately from said heating module 50, an arrangement at a suitable point in the blower 11 (FIG. 1) being preferred. The on/off switch 53 is mounted here at a prepared point on the blower housing 62. The on/off switch 53 is permanently mounted on a plate 63, which can be aligned, by means of a round hole 64 and an elongate hole 65, with respect to the pivot path of a pivot lever 66 secured to the blower housing 62. A spring tongue 67 is clamped at one end to the plate 63 and rests on the actuation plunger 55 of the on/off switch 53 and projects into the pivot path of the pivot lever 66. The pivot lever 66 can be pivoted from the cockpit of the vehicle by means of a Bowden cable 68, the on/off switch 53 being again aligned in such a way that in the pivot position of the pivot lever 66 shown by broken lines in FIG. 11, the switching contact for the on/off switch 53 is moved over by means of the spring tongue 67 into its working position which closes the circuit of the supplementary electric heater 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heating or air conditioning system for a passenger compartment of a motor vehicle, having a heat exchanger which is arranged in a cooling fluid circuit of an internal combustion engine and through which an air stream passes, and having a supplementary electric heater through which said air stream also flows, wherein the supplementary electric heater is integrated physically into the heat exchanger.

2. System according to claim 1, wherein the heat exchanger comprises:
   a plurality of water ducts through which the cooling fluid can flow and which extend in parallel at a distance from one another along an air passage surface of the heat exchanger and open at their respective ends into water collecting boxes, and
   heat-conducting elements which are connected to the water ducts,
   wherein the supplementary electric heater has a plurality of electric heating rod assemblies which extend between the water ducts and, distributed uniformly and parallel thereto, along the air passage surface of the heat exchanger.

3. System according to claim 2, wherein respective ones of the water ducts fitted with the heat-conducting elements and respective ones of the electric heating rod assemblies extend parallel one next to the other in an alternating fashions.

4. System according to claim 2, wherein each heating rod assembly has two busbars, extending parallel to one another, and a plurality of PTC elements which are arranged spaced apart from one another between the two busbars and are connected mechanically and electrically conductively thereto.

5. System according to claim 4, wherein at least one electric insulating plate is arranged between each heating rod assembly and an adjacent water duct, on which insulating plate both the heat-conducting elements connected to the water duct and the heat-conducting elements projecting from the busbars are supported.

6. System according to claim 5, wherein the busbars are secured at their ends in insulators which are attached to each water collecting box.

7. System according to claim 6, wherein the water ducts with the heat-conducting elements, the busbars with the heat-conducting elements, the insulating plates and the insulators extend over the entire depth of the heat exchanger viewed in the direction in which the air stream is conducted.

8. System according to claim 7, wherein each water duct is divided into a plurality of channel pipes which lie one next to the other, viewed at the depth of the heat exchanger, are separated from one another by, in each case, a channel wall, each of said water ducts having a rectangular cross section.

9. System according to claim 5, comprising a control unit provided to control the supplementary electric heater as a function of variables which determine the heat requirement, which control unit is arranged on the heat exchanger in such a way that the air flowing into the heat exchanger passes over it.

10. System according to claim 9, wherein the control unit has an electronic power system and heat-dissipating cooling elements, and
    wherein the control unit is arranged on an air inlet side of the heat exchanger in such a way that at least the cooling elements are located in the air stream.

11. System according to claim 9, wherein the control unit is arranged on a plastic frame which is fitted onto the heat exchanger on an air inlet side of said heat exchanger and is connected thereto.

12. System according to claim 5, wherein an on/off switch for the supplementary electric heater is spatially integrated into the supplementary heater and can be manually activated.

13. System according to claim 5, comprising a blower which is disposed upstream of the heat exchanger, in order to produce the air stream which flows through the heat exchanger and the supplementary electric heater, and
    wherein an on/off switch for the supplementary heater is spatially arranged on the blower and can be manually activated.

14. System according to claim 3, wherein each heating rod assembly has two busbars, extending parallel to one another, and a plurality of PTC elements which are arranged spaced apart from one another between the two busbars and are connected mechanically and electrically conductively thereto.

15. System according to one of claim 1, comprising a control unit provided to control the supplementary electric heater as a function of variables which determine the heat requirement, which control unit is arranged on the heat exchanger in such a way that the air flowing into the heat exchanger passes over it.

16. System according to claim 15, wherein the control unit has an electronic power system and heat-dissipating cooling elements, and
    wherein the control unit is arranged on an air inlet side of the heat exchanger in such a way that at least the cooling elements are located in the air stream.

17. System according to claim 15, wherein the control unit is arranged on a plastic frame which is fitted onto the heat exchanger on an air inlet side of said heat exchanger and is connected thereto.

18. System according to claim 17, wherein the electric heating rod assemblies, arranged between the water ducts of the heat exchanger, are each accommodated in a frame-like tub which projects from an underside of the plastic frame facing the heat exchanger and dips into the heat exchanger, and wherein preferably longer tub walls of the frame-like tubs form insulating plates extending between the heating rod assemblies and the water ducts with heat-conducting elements.

19. System according to claim 18, wherein the heating rod assemblies are accommodated in the frame-like tubs in such a way that connections of the heating rod assemblies which have identical polarities lie on the same frame limb of the plastic frame, and connections of the heating rod assemblies with different polarities lie, on opposite frame limbs, above the plastic frame.

20. System according to claim 19, wherein the plastic frame is fitted with a first multipoint connector, which is electrically connected to the supplementary heater and is electrically connected to the connections of the heating rod assemblies, wherein an electronic power system with a cooling element is arranged on a circuit board which can be attached to the plastic frame, and wherein the circuit board has both a second multipoint connector which makes contact with the first multipoint connector and sockets for electric connecting plugs.

21. System according to claim 20, wherein the plastic frame for securing the circuit board has a rectangular frame component which protrudes in an integral fashion from an upper side of the plastic frame, facing away from the heat exchanger, and on which the circuit board with an electronic power system which projects through the frame component and has cooling elements is fitted in a flush arrangement and attached.

22. System according to claim 20, wherein the first multipoint connector is arranged on the lower frame limb of the frame component, said limb lying in a plane with the plastic frame.

23. System according to claim 20, wherein electric connecting lines between the connections of the heating rod assemblies and the first multipoint connector are designed as contact rails which are laid in the plastic frame.

24. System according to claim 23, wherein the contact rails are fitted at their ends with contact tongues which together form the first multipoint connector, and wherein the second multipoint connector on the circuit board is composed of contact shoes which engage over the contact tongues.

25. System according to claim 1, wherein an on/off switch for the supplementary electric heater is spatially integrated into the supplementary heater and can be manually activated.

26. System according to claim 25, wherein the on/off switch is arranged with a switching contact in a circuit heater and projects with a switching contact activation plunger into a pivot path of a cam which is mounted so as to be pivotable by way of a Bowden cable.

27. System according to claim 26, wherein the cam is arranged on an air mixing flap for mixing a cold air stream, which passes around the heat exchanger, and a warm air stream, which is heated by the heat exchanger, wherein the on/off switch is aligned in such a way that, in the pivot end position of the air mixing flap, its switching contact is closed for maximum supply of warm air.

28. System according to claim 1, comprising a blower which is disposed upstream of the heat exchanger, in order to produce the air stream which flows through the heat exchanger and the supplementary electric heater, and wherein an on/off switch for the supplementary heater is spatially arranged on the blower and can be manually activated.

29. System according to claim 28, wherein the on/off switch is arranged with a switching contact in the circuit of the supplementary heater and projects with a switching contact activation plunger into a pivot path of a lever which can be pivoted by way of a Bowden cable.

30. System according to claim 29, wherein a sprung switching tongue is arranged between the switching contact activation plunger and the pivot lever, and wherein the pivot lever engages on the switching tongue, which itself acts on the switching contact activation plunger.

31. An air conditioning assembly for a vehicle passenger compartment, comprising:

a fluid to air heat exchanger disposable in a vehicle engine cooling fluid circuit, said heat exchanger being disposed in use to have an air stream pass therethrough with said heat exchanger exhibiting a heat exchanger volume defined by an air flow cross-sectional size in a plane perpendicular to the air stream flow direction and a depth in the air stream flow direction, and a supplementary electric heater disposable in use in said air stream, wherein said supplementary electric heater is disposed within said heat exchanger volume.

32. An assembly according to claim 31, wherein the heat exchanger includes a plurality of parallel cooling fluid ducts extending in use transverse to the air stream between a cooling fluid inlet manifold box and a cooling fluid outlet manifold box, and wherein said supplementary electric heater includes a heating rod assembly disposed between and extending parallel to a pair of said cooling fluid ducts so as to be disposed in use so that said air stream flows thereover.

33. An assembly according to claim 32, wherein the heating rod assembly extends over substantially the entire length of the respective cooling fluid ducts between the inlet and outlet manifold boxes.

34. An assembly according to claim 32, wherein each heating rod assembly has two busbars, extending parallel to one another, and a plurality of PTC elements which are arranged spaced apart from one another between the two busbars and are connected mechanically and electrically conductively thereto.

35. An assembly according to claim 32, comprising a control unit provided to control the supplementary electric heater as a function of variables which determine the heat requirement, which control unit is arranged on the heat exchanger in such a way that the air flowing into the heat exchanger passes over it.

* * * * *